United States Patent [19]

Altmann et al.

[11] 3,976,855

[45] Aug. 24, 1976

[54] ELECTRICAL HEATING MAT

[75] Inventors: Horst Dieter Altmann, Gruendau-Lieblos; Eberhard Haupt, Gruendau-Rothenbergen, both of Germany

[73] Assignee: Firma Wilhelm Haupt, Rothenbergen, Germany

[22] Filed: Dec. 6, 1974

[21] Appl. No.: 530,208

Related U.S. Application Data

[63] Continuation-in-part of Ser. No. 389,566, Aug. 20, 1973, Pat. No. 3,874,910.

[30] Foreign Application Priority Data

Aug. 22, 1972 Germany............................ 2241201
Sept. 18, 1972 Germany............................ 2245742

[52] U.S. Cl.............................. 219/532; 174/138 J; 219/213; 219/357; 219/546; 248/68 R; 338/290; 338/318

[51] Int. Cl.²........................ H05B 3/34; H01C 3/12

[58] Field of Search ........... 219/213, 345, 528, 532, 219/536, 537, 549, 552, 538, 355, 357, 542, 546; 174/95, 96, 97, 101, 138 J, 175; 264/151, 160; 339/105, 276 SF; 29/611; 338/279, 290, 294, 210–214, 283, 285, 304, 305, 315, 318–321; 248/68 R, 74 A

[56] References Cited

UNITED STATES PATENTS

| 2,022,518 | 11/1935 | Payne | 219/549 X |
|---|---|---|---|
| 2,478,809 | 8/1949 | Deal | 219/532 X |
| 2,567,547 | 9/1951 | Bussing | 174/138 J |
| 2,932,687 | 8/1960 | Cook | 174/117 |
| 3,069,522 | 12/1962 | Jamison | 338/290 X |
| 3,129,814 | 4/1964 | Cheh et al. | 339/276 SF |
| 3,153,140 | 10/1964 | Theodore et al. | 219/549 |
| 3,209,128 | 9/1965 | Chapman, Jr. | 219/528 |
| 3,265,864 | 8/1966 | Levinson | 219/545 |
| 3,294,240 | 2/1946 | Harrison | 248/68 R |
| 3,391,432 | 7/1968 | Du Rocher | 24/81 |
| 3,515,778 | 6/1970 | Fields et al. | 264/160 X |
| 3,524,922 | 8/1970 | Johnson | 174/138 J |
| 3,825,672 | 7/1974 | Malon et al. | 174/97 |
| 3,874,910 | 4/1975 | Altmann et al. | 264/160 |

FOREIGN PATENTS OR APPLICATIONS

| 1,127,175 | 8/1956 | France | 174/97 |
|---|---|---|---|
| 647,374 | 7/1937 | Germany | 248/68 R |
| 19,343 | 5/1971 | Japan | 219/213 |
| 884,296 | 12/1961 | United Kingdom | 219/213 |
| 659,728 | 10/1951 | United Kingdom | 174/95 |

*Primary Examiner*—A. Bartis
*Attorney, Agent, or Firm*—W. G. Fasse; W. W. Roberts

[57] ABSTRACT

An electrical heating mat comprises an electrical resistance heating wire arranged in a loop formation with substantially straight leg portions between curved portions. A plurality of spaced apart spacer strips made of thermoplastic material are provided to hold the heating wire its looped formation. Each spacer strip comprises an elongated narrow strip body having a plurality of spaced open-sided were receiving loops having an inner dimension assuring snap-fit reception of the wire therein. One end of each strip body is provided with a snap-in coupling member dimensioned to snap-fit into a wire receiving loop at the end of an adjacent spacer strip to enable a plurality of mats to be interconnected together to form a larger unit. Spacer lands extending generally parallel to the leg portions of the heating wire may connect the spacer strips together.

9 Claims, 7 Drawing Figures

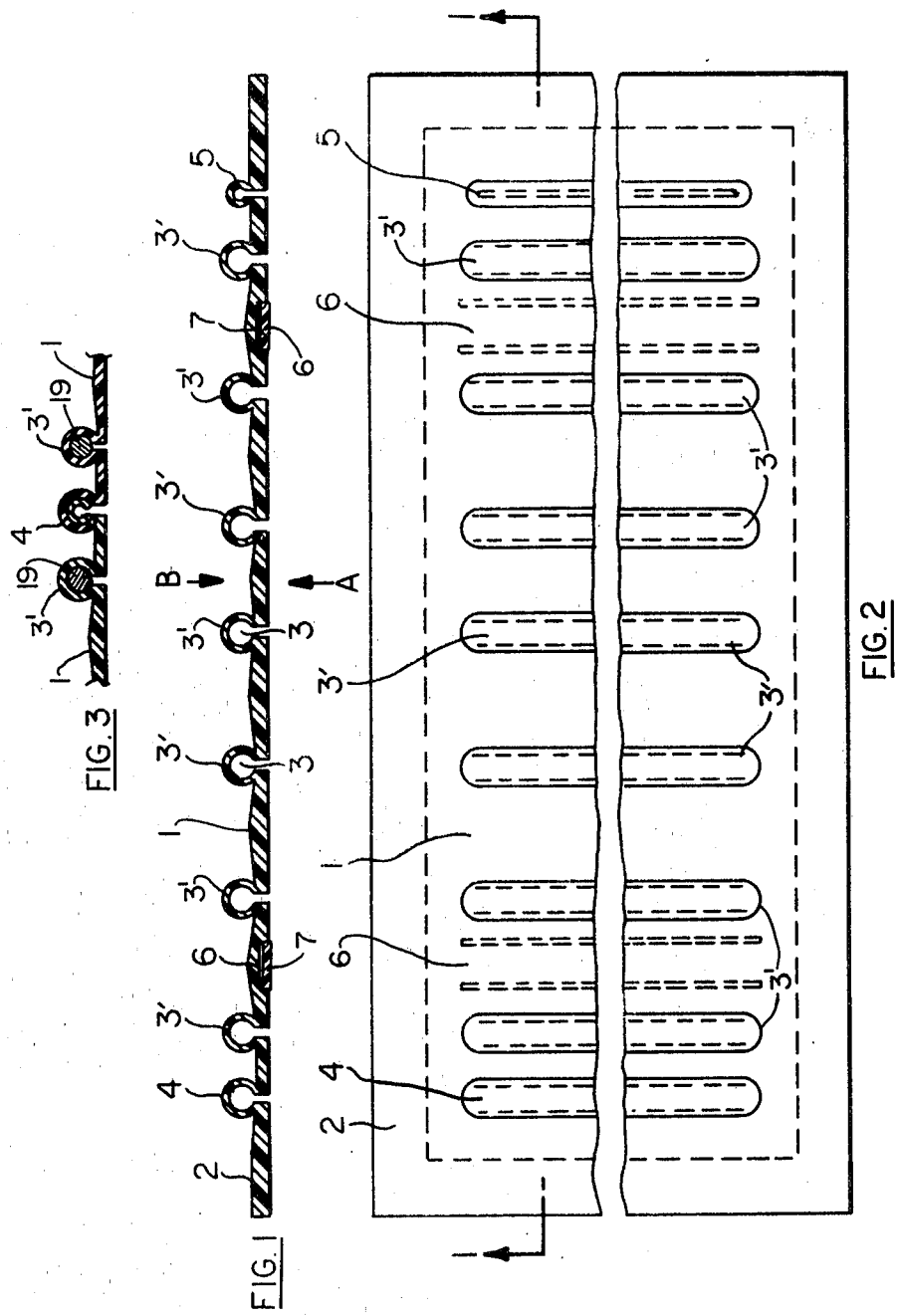

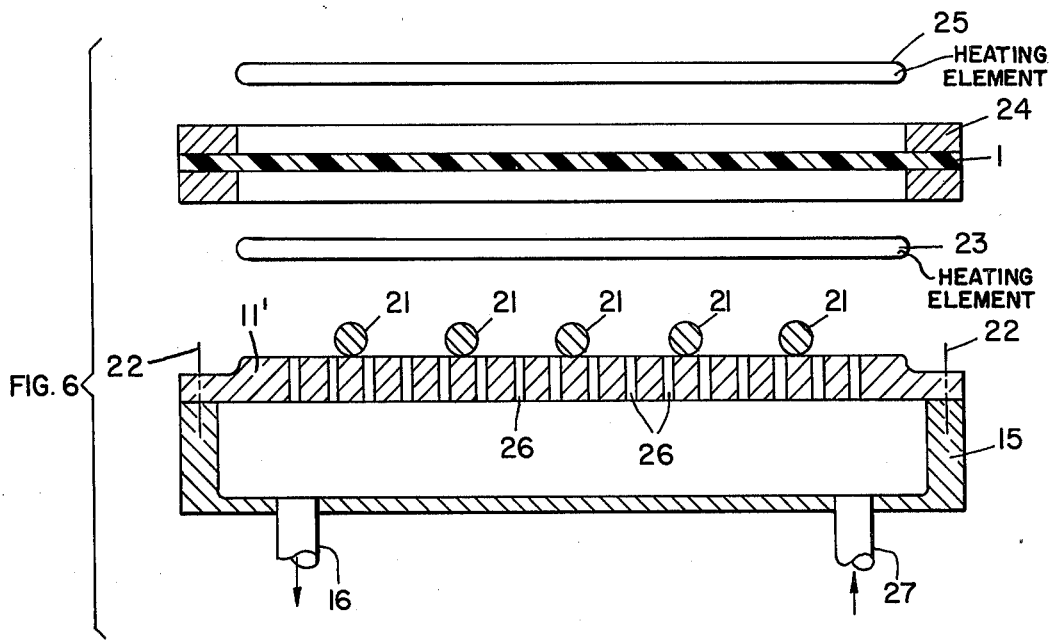
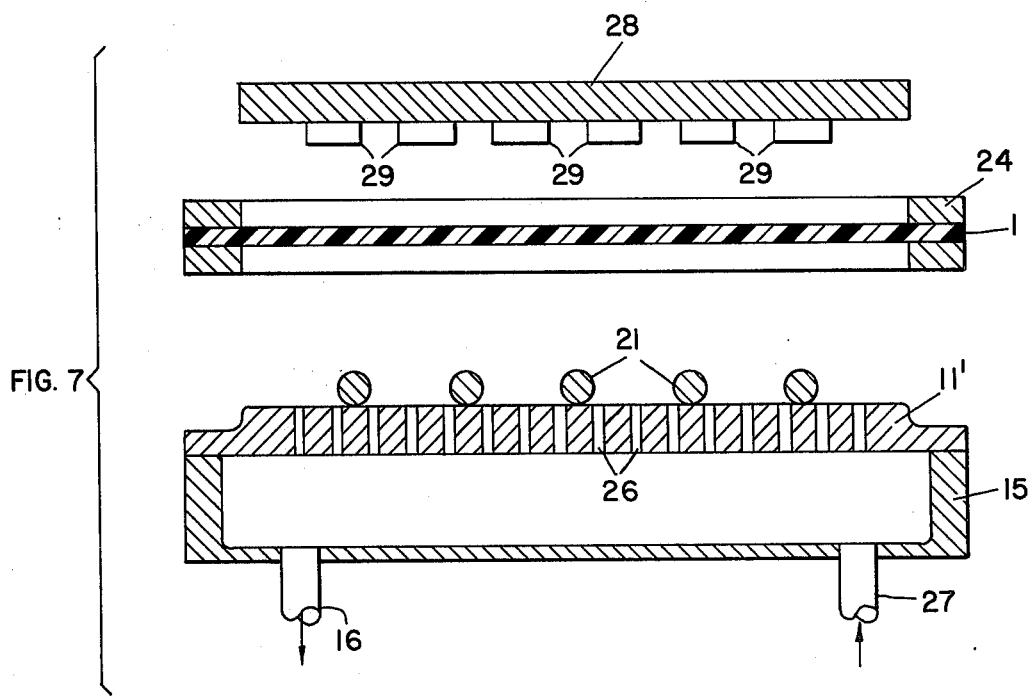

ELECTRICAL HEATING MAT

BACKGROUND OF THE INVENTION:

The present application is a continuation-in-part application of my copending application Ser. No. 389,566 filed Aug. 20, 1973, and now U.S. Pat. No. 3,874,910. My U.S. Pat. No. 3,874,910 relates specifically to the manufacture of the spacer strips.

The present invention relates to electrical heating mats and a method and apparatus for producing such mats. The spacer strips produced in accordance with my above mentioned copending application are used in the production of the present electrical heating mats.

German Pat. No. P 21 27 567 discloses electrically heated mats and structural elements for the production of such mats. These known mats comprise electrical heating elements in the form of meandering heating loops having legs arranged in parallel to each other, wherein these legs are secured to cross bars extending at right angles relative to the longitudinal length of the heating loops. In this fashion, the heating loops and the cross bars form together a grid type mat which may be installed as desired.

The prior art mats as described above permit their production in any desired shape due to said cross bars. Further, the final assembly of the mats, that is, the insertion of the heating conductors into the cross bars may be done depending on the particular circumstances. In other words, the complete mats may be assembled in the work shop, especially where relatively simple heating surfaces are involved. On the other hand, the cross bars also permit an assembly at the construction site, especially where more involved surfaces are to be covered with these heating mats as is frequently the case in hospital rooms or the like.

In addition to the advantage of allowing for the formation of any desired shapes, the heating mats according to the prior art have other advantages. They are easily transported because they may be rolled up or plugged together and so forth. These mats further avoid separating layers in the flooring plaster due to the large mesh grid formation. This feature has the further advantage that the mats may be installed in a single work process.

In a further prior art embodiment means are provided for relieving the heating conductors from a bearing function within the grid arrangement. This relief is accomplished in that the cross bars which secure the heating conductors in position are interconnected with each other by spacing lands extending in the longitudinal direction of the mat or rather in the direction of the heating conductors.

Due to this feature of the prior art heating mats, it is possible to pre-assemble the grid in such a manner that it may be rolled up and that the grid may be cut with due regard to the area to be heated whereupon the heating conductors are simply pressed into the holding means of the cross bars in order to secure the heating conductors in accordance with the shape of the area to be heated. The holding means of the cross bars are arranged at relatively close but equal spacings, whereby sufficient flexibility is provided for rerouting the heating conductors in order to make necessary openings, for instance for wash stands, toilet bowl areas and the like, without causing an unpermissible heat density or heat congestions.

In addition to the above described prior art heating mats, comprising in the one system interconnecting cross bars and in the other system such cross bars in combination with longitudinally interconnecting lands, there are known grid-shaped heating mats, wherein the heating conductors are mounted to concrete reinforcing steel grids. In addition, there are known area heating means such as heating pads and electric blankets, wherein the heating conductors are embedded in rather pliable materials such as fabrics or the like.

From the above description of the prior art it is apparent that the cross bars with their holding means for securing the heating conductors or resistors and their structural features are critical for the technical and economical characteristics of the above described two prior art systems. Thus, there is known a first type of cross bar in which the heating resistors or elements are secured in equally spaced slots provided in band or strip material arranged in an upright position, whereby said slots are self-locking. In a second type of cross bar the band or strip material is also provided with slots, however, the slots are not self-locking and therefore U-shaped clamping members are used to cover the slots. In a third embodiment the cross bars also comprise a band or strip material, however, in this arrangement the band or strip material is maintained in a flat position and provided with equally spaced three-sided incisions which are preferably located in the center of the flat strip material, whereby tongues are formed which correspond to the cross section of the cable or heating conductor. The just described three basic arrangements may, of course, be modified in many different ways. In any event, the first and second type described above have the disadvantage that their use requires a relatively plain surface for the installation. Further, where spacing lands are employed, they must be provided with plug incisions, whereby the whole system is weakened unless additional rather costly connecting means are employed, for example, along the angled butt connections, by means of welding or gluing, whereby the welding would involve a fillet weld or joint.

The third type of interconnection described above has the disadvantage that making of said incisions also involves a rather technical effort, whereby the formation of said tongues usually requires the application of heat.

OBJECTS OF THE INVENTION

In view of the foregoing, it is the aim of the invention to achieve the following objects singly or in combination:

to remove the drawbacks of the prior art, more specifically to provide a method for the simple and economical production of the cross connecting elements or spacer strips for electrical heating grids, whereby the spacer strips are to extend in a flat position for the securing of the heating resistor elements;

to provide spacer strips which will easily permit the rolling up of the heating mats, whereby the spacer strip will form part of a supporting grid structure of the heating mats which may have any desired shape;

to provide spacer strips which may be easily interconnected with each other in series to form mats of any desired width and which strips may also be easily connected in parallel to each other to form mats of any desired length, without interfering with the desirable roll up feature of the mats for their easy transport;

to provide interconnecting means for electrical heating mats which make these mats highly adaptable to the individual requirements of any heating problem;

to facilitate the installation at the building site, as well as the assembly in the shop, regardless how many individual widths of heating mats are to be interconnected;

to provide heating mats which are easily adaptable to surfaces to be heated which are not plain or where the heating mat must cover a curved surface;

to provide interconnecting cross spacer strips for heating mats which will facilitate the parallel installation of several mats to form heating surfaces of rather large widths;

to provide spacer strips with self-locking slots or grooves for the heating elements which slots or grooves will assure the proper relative positioning of the heating elements, even where the mat must be installed so as to negotiate a curve; and to provide an apparatus for the formation of the spacer strips, whereby with the aid of an exchangeable grooving tool plate grooves of different dimensions may be formed in the thermoplastic sheet material.

SUMMARY OF THE INVENTION

According to the invention there is provided a method for making electrical heating mats, wherein electrical resistance elements are held in plastic means or so called spacer strips produced by deforming thermo-plastic sheet material to mold a plurality of elastically deformable grooves in said sheet material, whereby said grooves extend substantially in parallel to each other and at given spacings from each other in the sheet material. The grooved sheet material is then cut into a plurality of separate strips so that the cuts extend substantially across the longitudinal extension of the grooves. Thereafter, the electrical resistance heating elements are inserted into the grooves with a press or snap fit and in a looping formation.

The thermoplastic sheet material is preferably, but not necessarily polyethylene and the vacuum molding by means of which the heated sheet material is sucked into longitudinal grooves or drawn down around longitudinal rods extending in parallel may be compared to a deep drawing process.

The method according to the invention is rather economical and has the additional advantage that the heating elements may be secured in exact positions relative to each other, whereby each securing element has the same shape and thus provides the same uniform clamping action. Another advantage of this method is seen in that the width of the spacer strips may be selected in accordance with any particular requirements. Thus, narrow or wide strips may be cut from the same grooved sheet without the need for additional tools or the like.

The spacer strips employed herein comprise the element receiving grooves, preferably in the shape of open faced loops, which are preferably equally spaced from each other except at the end of the strip where a coupling means, for example, a loop of smaller diameter is spaced from the next adjacent groove by about one half the normal spacing between adjacent grooves. The smaller loop fits into the groove of the loop of the next adjacent spacer strips, whereby a plurality of spacer strips may be connected in series with each other. This feature has the advantage that the heating mats may be extended in their surface area as desired. Thus, heating mats small enough to provide just standing space for one person, for example, in a bathroom in front of the bathtub have been produced along with heating mats large enough to heat an entire bridge.

Further, the present spacer strips are provided with additional grooves for the securing of spacer lands, all of which may have the same length or they may have different lengths and different shapes. The spacer lands in the additional grooves make it possible to strengthen the entire grid structure in accordance with the individual static requirements thus providing a grid structure which is independent of the static characteristics of the individual heating conductors. Moreover, these spacer lands make it possible due to their different length and/or shape to arrange the heating mat in such a manner that it deviates from a straight line in any desired direction.

BRIEF FIGURE DESCRIPTION

In order that the invention may be clearly understood, it will now be described, by way of example, with reference to the accompanying drawings, wherein:

FIG. 1 illustrates a sectional view through the sheet material provided with the grooves according to the invention, said section extending substantially along line 1—1 in FIG. 2;

FIG. 2 illustrates a plan view onto a sheet of thermoplastic material provided with the grooves according to the invention but prior to the cutting operation;

FIG. 3 illustrates a view similar to that of FIG. 1 and shows the coupling of two spacer strips in series with each other;

Figure 4:
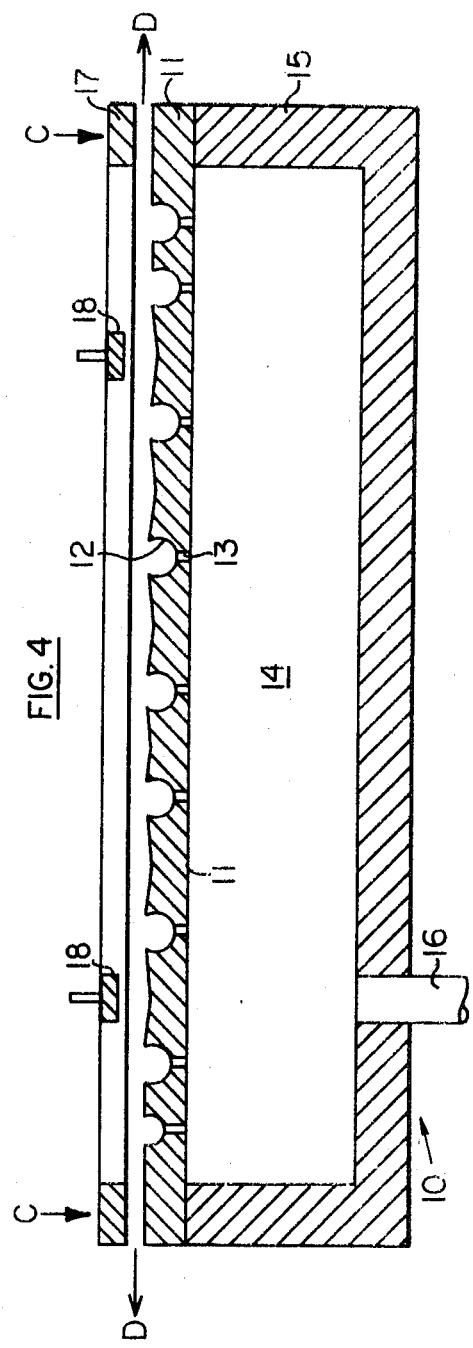
FIG. 4 is a schematic sectional view through a tool for forming the thermoplastic sheets in accordance with the present method.

FIG. 6 is a sectional view similar to that of FIG. 4, however, the grooving tool is now a cover plate with a plurality of parallel rods secured to the outer surface of the grooving tool plate; and FIG. 7 is a sectional view similar to that of FIG. 6, but omitting the heating elements, and showing in addition a presser plate which may facilitate the formation of the grooves in the thermoplastic sheet material.

DETAILED DESCRIPTION OF EXAMPLE EMBODIMENTS

FIG. 2 illustrates a rear plan view onto a thermoplastic sheet of panel 1, as viewed in the direction of the arrow B in FIG. 1. The margin 2 of panel 1 is clamped onto a tool plate, as will be described in more detail below with reference to FIG. 4. The first step of the method according to the invention comprises forming the loops 3' into the sheet of thermoplastic material such as polyethylene. The loops define grooves 3 adapted to receive the electrical conductors of the electrically heated mat.

Simultaneously with the formation of the loops 3' additional grooves 6 may be formed into the body of the strip material. These grooves 6 are adapted to receive connecting spacer lands 7 as illustrated in FIGS. 1 and 5.

The spacings between adjacent loops along the length of each spacer strip are approximately equal to each other, except for the spacings between the last two loops 4 and 5. It will be noted that the loop 5 is smaller in size than the remaining loops. This feature makes it possible to couple several spacer strips to each other in series as illustrated in FIG. 3. For this purpose the marginal portions adjacent to the loop 4 and adjacent to the loop 5 are removed from the spacer strips. By spacing the loops 4 and 5 from the next adjacent loop 3' approximately one half the normal spacing between the loops 3', it is possible to interconnect adjacent spacer strips without any interruption in the even distribution of the heating elements.

Figure 5:
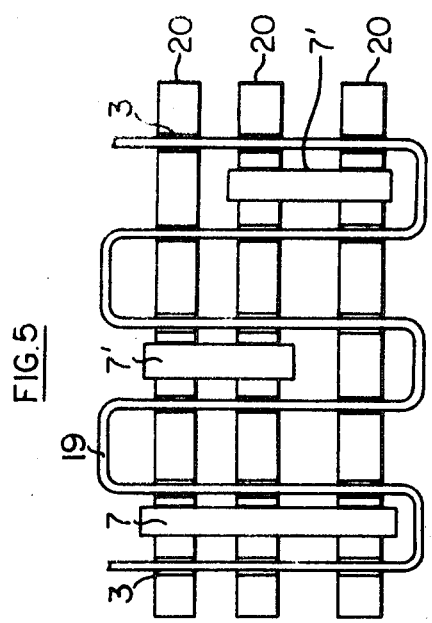
FIG. 5 is a schematic plan view of a mat, according to the invention, and as viewed in the direction of the arrow A in FIG. 1.

After the formation of the loops 3' the sheets are removed from the tool plate and cut into strips 20 as best seen in FIG. 5. These strips may have any desired width depending on the required structural rigidity of the finished mats.

Referring to FIG. 4, there is shown a tool 10 having a tool plate 11, the top surface of which is provided with grooves 12 in the shape of the loops to be formed. These grooves 12 in the tool plate 11 are connected through channels 13 to a space 14 in a housing 15, which may, for example, be evacuated through a port 16. The tool comprises a clamping frame 17 which clamps the edges 2 of the panel 1 down onto the tool plate 11 in the direction of the arrows C. The details of the clamping means are well known in the art.

If desired, the sheet may be stretched outwardly prior to applying the clamping frame 17. The stretching could be accomplished by hand or other well known means, in order to smooth out the sheet or panel in the direction of the arrows D all around the tool plate. In order to form the grooves 6 simultaneously with the loops 3', there are provided respective tool members 18 which are movable up and down by well known means, for example, by a piston cylinder arrangement.

Incidentally, the panel 1 is not shown in FIG. 4 for simplicity's sake. After the panel has been clamped down in the manner shown, the temperature of the panel will be raised by means not shown but well known in the art, in order to facilitate the flow of the panel material into the grooves 12 of the tool plate 11. After the panel 1 has reached the desired temperature or flowability, a pressure may be applied, for example, by a tool member lowered from above onto the panel 1. However, the preferred embodiment of practicing the present method involves applying a reduced pressure to the space 14, whereby the panel will be sucked into the grooves 12. From the shape of the loops 3' and the interconnecting strip portions between adjacent loops it will be noted what deforming work has been done on the thermoplastic sheet material.

After the completion of the deformation the sheet material is cooled down again and the sheet will deform sufficiently in an elastic manner to remove the loops 3' from the grooves 12. Thereafter, the cutting takes place preferably in a direction extending perpendicularly to the longitudinal extension of the loops 3'.

FIG. 5 illustrates a somewhat schematic plan view of a heating mat according to the invention, whereby the view is in the direction of the arrow A in FIG. 1, that is onto the open faced grooves 3 which receive the electrical conductor 19, preferably in a press or snap fit manner, whereby these conductors are securely held in the grooves 3. The spacer strips 20 may have any desired width and several of these strips may be connected to each other by the spacer lands 7 or 7' which fit into the relatively shallow grooves 6 shown in FIG. 1. Here again a press-fit between the grooves 6 and the spacer lands 7 or 7' would be preferred. The spacer lands 7, 7' may have any desired length or shape and they may be distributed through the entire mat in any desired fashion. This feature has the advantage that the mat may be shaped to cover curved areas to be heated.

The present mats are formed by distributing the spacer strips on a work surface with the desired spacing between adjacent strips and with all the grooves facing upwardly. Thereafter the electrical heating wire elements are inserted by hand into the upwardly facing grooves with a press or snap fit.

A practically suitable dimension of standard stock panels, for example, of polyethylene material was 1,000 × 60 mm, and the grooves were spaced from each other by 22 mm. This panel was then cut into spacer strips having a width of 10 mm.

The present spacer strips will preferably be used as cross strips extending across the length of the heating mat. However, they may also be used as longitudinal connecting strips, whereby also a sufficient stability is achieved due to the secure connection between the spacer strips and the heating elements so that undesirable deformations of the mat may be avoided.

Although, in the preferred embodiment the loops have an omega shape, it will be appreciated that any type of groove shape suitable to assure said press or snap fit may be employed for securely receiving the electrical heating conductors.

Referring to FIG. 6 the sectional view illustrates a modification of the apparatus of FIG. 4. The hollow base or housing 15 with its evacuation port 16 is the same as in FIG. 4. However, the tool plate 11' differs from that of tool plate 11, shown in FIG. 4. The tool plate 11' is provided with a plurality of rods 21 extending in parallel to each other on the top surface of the tool plate 11' and secured thereto, for example, by welding, gluing or the like. The tool plate 11' is removably secured to the base or housing 15, for example by screws as symbolically shown at 22. Above the tool plate 11' there is symbolically shown a heating element 23, for example, an infra-red heating element. A stretching frame 24 is arranged above the heating element and, if desired, a further heating element 25 may be arranged above the stretching frame 24, which holds the thermoplastic sheet material 1.

The heating elements 23 and 25 are arranged to be movable into the space above and below the stretching frame 24. The means for moving the heating elements back and forth are not illustrated, since they are not part of the invention and since they are well known in the art.

The housing 15 with its tool plate 11' and the stretching frame 24 are arranged to be movable toward each other. Thus, either the housing 15 with the tool plate 11' or the frame 24 may be stationary, whereby the respective other element will be movable. The means for moving these elements toward and away from each other are also well known in the art and are not part of the invention.

The parallel rods 21 are preferably evenly spaced from each other and preferably uniformly distributed over the surface of the tool plate 11'. It has been found that it is particularly easy to vacuum mold the thermoplastic sheet 1 once it has been sufficiently heated, around the rods 21 to form, for example, omega shaped grooves in the thermoplastic sheet 1, by the application of vacuum through the port 16 and through the holes 26 in the tool plate 11'. The apparatus according to FIGS. 6 and 7 is especially economical since it is rather simple to attach the rods 21 to the top surface of the tool plate 11 and any machining for the formation of grooves in the top plate itself is obviated. Further, it is easy to replace the tool plate 11 by another one carrying rods 21 of a different diameter so that the inner diameter of the respective grooves in the sheet material 1 is easily adapted to various outer diameters of commercially available electrical heating wires. This is also an important economical advantage of the invention, especially since the rods 21 may be cut from standard stock material such as steel rods available in many different diameter sizes.

The top surface of the tool plate 11 is surrounded by a shoulder adapted to receive the lower member of the frame 24 in such a manner that the heated sheet material 1 is somewhat evenly stretched over the rods 21 in preparation of the vacuum application. Incidentally, the sheet 1 will be heated to, for example, 220°C. The vacuum application will preferably be accomplished through a plurality of ports 16, however only one such port is shown.

Once the sheet 1 has been vacuum molded or deformed over and around the rods 21, air pressure will be applied through a port 26 to lift the now grooved sheet off the rods 21. Thereafter the sheet is cut as described above, so that the cuts run substantially across to the longitudinal extension of the grooves. Prior to the actual strip cutting it may be desirable to trim off the edges around the sheet which have been held by the frame 24.

FIG. 7 illustrates the same elements as FIG. 6, except that the heating elements 23 and 25 are not shown and except that a molding tool is shown in the form of a pressure plate 28, which is movable up and down in a conventional manner and the lower surface of which is provided with padding means 29, for example, strips of foam rubber arranged in such a manner and spaced from each other that they fit into the spacings between the rods 21. Where a foam material of sufficient compressibility is used, a continuous pad could be employed instead of the plurality of strips 29. However, it should be mentioned that the invention works perfectly even without the presser plate 28.

It will also be appreciated that the cross sectional shape of the grooves may be varied by changing the cross section of the rods 21, for example, by flattening these rods along one side more or less.

Although the invention has been described with reference to specific example embodiments, it is to be understood, that it is intended to cover all modifications and equivalents within the scope of the appended claims.

What is claimed is:

1. An electrical heating mat comprising electrical resistance heating wire means in a loop formation with substantially straight leg portions between curved portions, a plurality of spaced apart spacer strip means to hold said heating wire means in said loop formation, each of said spacer strip means including a strip body having a given width, open sided wire receiving means in each strip body, said wire receiving means extending substantially across the width of each strip body, said wire receiving means having an inner free space correlated to the outer dimension of the wire means so as to assure a snap-fit reception of the wire means in the wire receiving means, said leg portions of said wire means extending substantially across said spacer strip means, said spacer strip means further comprising coupling means arranged at one end of said spacer strip body for interconnecting the longitudinally aligned spacer strip means of several mats into larger units, said coupling means comprising a snap-in member at one end of said strip means, said snap-in member having an outer dimension sized to snap into the wire receiving means at the end of an adjacent spacer strip means.

2. The electrical heating mat according to claim 1, wherein said wire receiving means comprise a plurality of loops having an inner dimension to snap-fit a wire means into each loop, said loops being substantially equally spaced apart by a given distance in each of said strip means, said snap-in member of the coupling means being arranged at one end of the strip means and spaced from the next adjacent wire receiving loop in the same strip means a distance substantially equal to one-half said given distance.

3. The electrical heating mat according to claim 2, wherein said snap-in member comprises a loop of smaller size such that the outer dimension of the snap-in loop snap-fits into the inner dimension of a wire receiving loop at the end of an adjacent strip.

4. The electrical heating mat according to claim 2, wherein each of said strip means comprise an additional loop at the opposite end of the strip means, said additional loop being spaced from the next adjacent wire receiving loop of the same strip by substantially one-half of said given distance, said additional loop having an inner dimension to receive said snap-in member in a snap-fit.

5. The electrical heating mat according to claim 1, wherein said spacer strip means are made of thermoplastic material.

6. The electrical heating mat according to claim 1, wherein said strip body comprises flat sections interconnecting adjacent wire receiving means.

7. The electrical heating mat according to claim 1, further comprising a plurality of spacer lands secured to said strip means and extending between adjacent strip means.

8. The electrical heating mat according to claim 7, further comprising additional grooves extending across the width of each of said strip means, said spacer lands being held in said additional grooves.

9. The electrical heating mat according to claim 1, wherein said wire receiving means are loops having an omega shaped cross section.

* * * * *